United States Patent [19]

Polzin et al.

[11] Patent Number: 5,644,760

[45] Date of Patent: Jul. 1, 1997

[54] PRINTED CIRCUIT BOARD PROCESSOR CARD FOR UPGRADING A PROCESSOR-BASED SYSTEM

[75] Inventors: R. Stephen Polzin, Morgan Hill; Noah M. Price, Campbell; Duane M. P. Takahashi, San Jose, all of Calif.

[73] Assignee: Apple Computer, Inc., Cupertino, Calif.

[21] Appl. No.: 432,906

[22] Filed: May 1, 1995

[51] Int. Cl.$^6$ .................. G06F 1/04; G06F 13/00
[52] U.S. Cl. .................. 395/555; 395/500
[58] Field of Search .................. 395/550, 800, 395/650, 700, 750, 500, 162, 163, 164; 364/228, 270, 270.3, 280.2, 281.3

[56] References Cited

U.S. PATENT DOCUMENTS

| | | | |
|---|---|---|---|
| 5,278,730 | 1/1994 | Kikinis | 361/686 |
| 5,434,592 | 7/1995 | Dinwiddie, Jr. et al. | 345/133 |
| 5,450,574 | 9/1995 | Madter et al. | 395/550 |
| 5,481,573 | 1/1996 | Jacobowitz et al. | 375/356 |
| 5,483,656 | 1/1996 | Oprescu et al. | 395/750 |
| 5,506,981 | 4/1996 | Madter | 395/550 |
| 5,515,514 | 5/1996 | Dhuey et al. | 395/282 |

OTHER PUBLICATIONS

National Semiconductor, "National Semiconductor General Purpose Linear Devices Databook", 1989, pp. 1–8 thorugh 1–12 and 2–4 through 2–13.

*Primary Examiner*—Thomas M. Heckler
*Assistant Examiner*—Dennis M. Butler
*Attorney, Agent, or Firm*—Burns, Doane, Swecker & Mathis L.L.P.

[57] ABSTRACT

A printed circuit board (PCB) processor card is described. The processor card includes a processor, its associated processor card system bus, a clock generator, and its associated processor card system clock bus. The processor card is designed to include the elements that are most likely to be upgraded, i.e. the processor and the clock. As such it is particularly useful when employed for system upgrades.

8 Claims, 6 Drawing Sheets

PRINTED CIRCUIT BOARD PROCESSOR CARD FOR UPGRADING A PROCESSOR-BASED SYSTEM

FIELD OF THE INVENTION

The present invention relates to the field of computer systems and particularly to methods of upgrading computer systems.

BACKGROUND OF THE INVENTION

In an attempt to meet the growing demands of the personal computer (PC) consumer, PC manufacturers are constantly improving system performance. Historically, consumer demands have focused on upgrading five main aspects of the PC: processor speed and functionality, memory speed and size, power consumption, visual quality, and I/O performance. Manufacturers improve PCs through technological advances in the processes used to fabricate the integrated devices within the PC and/or through hardware or software design improvements. The PC producers often strive to implement these technological or design advances into consumer available products as soon as possible in order to keep up with consumer demands and to compete with other PC manufacturers.

Given the rapid advances in technology, a computer system can become obsolete in a relatively short amount of time. Consequently, computer owners often desire to upgrade their current systems to obtain the processing advantages of the changing computer market in the most cost effective manner. One way in which a consumer may upgrade their computer system is by replacing the printed circuit (PC) board (often referred to as the motherboard) that is housed within the computer system. The motherboard of a computer system commonly holds and interconnects the main processor device, a clock generation device and other integrated devices and components that determine the functionality of the system. However, replacing the whole motherboard as a unit tends to be a narrow upgrade path for the consumer since it is limited by the physical constraints of the box in which the motherboard resides. Commonly, future motherboards have different shapes and sizes not adaptable to previous box designs. Also, replacing the motherboard is relatively expensive and often times not a viable option to the consumer.

In addition, from the perspective of a PC manufacturer, redesigning motherboards is a time consuming process. Presently, it takes close to a year to design and implement a new motherboard. Consequently, upgrades cannot be made available to the consumer during this time and neither manufacturers nor consumers gain the benefits of the technological advances until the redesigned motherboard is ready.

Another upgrade option is implemented by replacing the current processor device residing on the motherboard, with a new upgraded processor device. In general, upgraded processors are designed to be faster and more power efficient than their predecessors due to newly developed technologies and circuit designs. As a result, the consumers can upgrade the speed of their computer system by replacing their current processor device. In addition, redesigning a processor device is more cost and time effective than redesigning a complete motherboard.

Since the upgraded processor has increased speed capability, it typically has different clocking requirements than that which is provided by the clock generation device residing on the original motherboard. Consequently, to take advantage of the new processor's increased speed, the original clock signal from the motherboard is often multiplied up to a rate at which the new processor can operate. Presently, increasing the rate of the motherboard clock is performed internally by the processor device with additional phase locked loop (PLL) circuitry.

The disadvantage of this upgrade option is that the new processor chip is designed to upgrade only that particular motherboard design. The reason for this is that the processor's I/O bus is designed to have a communication protocol that is adaptable to a particular motherboard design. Further, the PLL of the processor device is tuned to increase the clock rate for a given fixed motherboard clock rate. As a result, the consumers may be limited to which processor they can upgrade with.

Upgrading with a new processor device may also be done without adapting the clock rate of the motherboard to the new processor. However, in this case, the advantages of speed provided by the new processor are not realized and thus this upgrade option is greatly limited.

Another problem with replacing the processor device occurs in the case in which a PC manufacturer offers a range (or family) of computer systems allowing the consumers to choose within the family in order to satisfy their processing needs. Commonly, the family of processors offer different processing options. In order to provide these various options each family member has a corresponding different motherboard design adapted to a particular processor chip. Due to the fact that each family member has a different motherboard design, a processor device that can be used to upgrade one family member cannot be employed for upgrading another family member. For example, it might not be possible to upgrade a lower-end processor in the family with the same processor device as a higher-end processor. Thus, once again, a particular motherboard's upgradeability may be limited by whether an upgraded processor device is available.

What is needed is a means of upgrading a computer system without the associated time delays and cost of redesigning a motherboard and without the limitations associated with replacing the processor device on the motherboard.

SUMMARY OF THE INVENTION

The present invention provides a flexible upgradeable computer system by employing a removable printed circuit board (PCB) processor card that is connectable to a system host card. This can be extended usefully to offer a variety of interchangeable processor cards, each designed to offer different processor device and clock generation device options. This can be further (or optionally) extended by providing a variety of system host cards, any one of which can be connected to and operated in conjunction with a given processor card. Various host cards can offer different hardware or function options. If there are more than one processor card and more than one host card available, a variety of computer systems can be assembled.

Each processor card includes a processor device and a clock signal generation device. The processor device is coupled to an associated processor card system bus that is employed for carrying signals to and from the processor. In one embodiment of the present invention, the processor device is the central processing unit (CPU) of a computer system. The clock signal generation device on the processor card provides at least one clock signal to the processor device and to a processor card system clock bus. In one embodiment of the present invention, the system clock bus carries multiple clock signals. In another embodiment, multiple various frequency clock signals are provided to the processor. And in still another embodiment, clock signals provided to the processor are delayed to adjust for clock skew between processor clock signals and system clock signals.

The host card includes system devices other than the clock signal generation device and the processor device. The host card includes a host card system bus for carrying signals to and from the system devices and a host card system clock signal bus for coupling clock signals to the system devices.

Processor card system bus and system clock bus are conductively connected to host card system bus and system clock bus to form a complete computer system. In the case in which more than one processor card and more than one host card are available, all processor card and host card system and system clock buses are designed to be compatible. The clock signal generation device is implemented such that it generates a clock signal compatible to the processor device and provides clock signals compatible to the system devices through the coupled processor and host card system clock buses.

In one embodiment of the present invention the processor card holds multiple processor devices. Thus, the present invention also provides a means of changing a single processing system into a multi-processor system. In this embodiment, the co-processors share the system bus. System bus arbitration is provided by the host card.

The processor card includes more than one power supply line or plane for providing voltage supplies to support different device technologies. The supply lines/planes are conductively connected to an external power supply or receive power from the host card. In one embodiment, the processor card has 5.0 and 3.3 volt supply lines for supporting 5.0 and 3.3 volt processor and clock device technologies. In another embodiment the processor card includes a voltage regulator which provides a range of voltages, in addition to the voltages on the supply lines. The regulator is biased by one of the voltages provided by the voltage supply lines.

In a preferred embodiment, a genetic printed circuit board (PCB) design may be used for a given set of processor cards in order to minimize processor card redesign time. The design of the layout of the PCB is generic with respect to all processor cards such that the processor and clock device positions as well as the processor and clock bus traces are essentially consistent across most of the processor card designs. The generic PCB design can then be modified to accommodate the various voltage and packaging requirements for a range of processor and clock generation device designs employed by each version of processor card.

In still another embodiment, the area on the generic PCB for holding the processor and/or clock devices can be modified to accommodate a range of different device package types while the remaining layout of the generic PCB remains unchanged.

DETAILED DESCRIPTION

The present invention provides a method and system for a flexible upgradeable computer system. In the following description, numerous specific details are set forth, such as processor voltage and packaging characteristics, computer system options, etc., in order to provide a thorough understanding of the present invention. It will be obvious, however, to one skilled in the art that these specific details need not be employed to practice the present invention. In other instances, well-known computer system architectures have not been described in detail in order to avoid unnecessarily obscuring the present invention.

Figure 1:
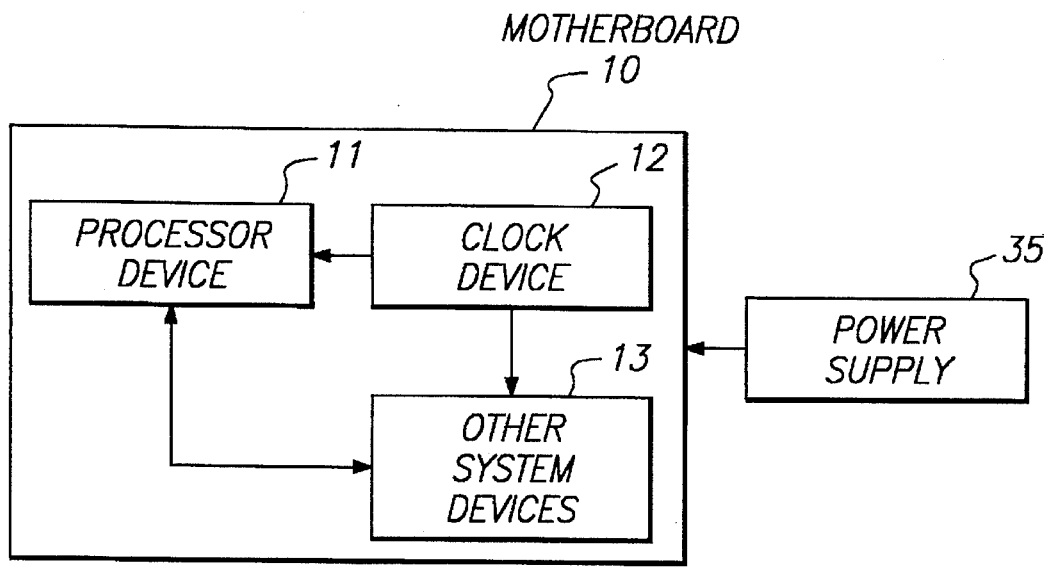
FIG. 1 illustrates a prior art motherboard configuration having an interchangeable processor device.

FIG. 1 illustrates a prior art computer system motherboard 10 housing a processor device 11, a clock generation device 12, and a block representing all of the other system devices 13 that the motherboard may include. Typically, the other system devices 13 provide the motherboard with the capability of giving the computer system particular functions unique to that board. For instance, integrated circuit devices 13 may include elements that affect 1) the resolution and color displayed by the screen, 2) the manner in which the system processes input and output data, or 3) the types of media information that the computer system can interface with. Specific examples include video drivers and control chips, I/O interface chips, and bus interface chips, for communication, for example with a NuBus or PCI bus. Many examples of motherboards as well as numerous examples of these types of integrated circuits are known in the art. A prior art motherboard is designed to support and connect each attached element to provide a functional computer system. However, changing even one element typically requires making other changes to the motherboard to keep the unit functioning efficiently.

Presently, the manner in which this type of computer system (shown in FIG. 1) is upgraded is by either replacing the whole motherboard (contingent on many factors, e.g. the physical attributes of the box housing the motherboard) or by replacing processor device 11 (contingent on whether an upgraded processor is available).

Replacing a motherboard involves opening up the computer housing, disconnecting some number of wires (sometimes but not always concentrated in one or more connectors), removing the old motherboard, inserting the new motherboard, reattaching any necessary wires correctly and closing the computer housing. The main disadvantage of replacing the motherboard is that it is a costly upgrade option to the consumer and requires some skills beyond the capability of many consumers. In addition, it is a time consuming and expensive process for PC manufacturers to redesign new motherboards for each system upgrade.

Replacing a processor device heretofore has been achieved by a) substituting an alternate processor, if a pin-compatible processor is available, or b) adding a daughtercard containing a new processor and in some instances some secondary devices, such as additional memory. The main disadvantage of replacing the processor device is that the system clock is used by many if not all components on the motherboard and therefore system clock generation is provided on the motherboard. To use the original system clock with an upgraded processor usually requires increasing the fixed motherboard clock rate to accommodate the clock rate requirements of the replacement processor device. The clock rate for the processor is increased by integrating phase lock loop (PLL) circuitry within the processor device to multiply the fixed motherboard clock rate to the rate of the new processor. Since the PLL is tuned to a particular input rate, it can only be effectively used with motherboards having the input rate that it is tuned to. As a result, only certain processors can be used with certain motherboards, thereby limiting system upgradeability.

Processor Card

Processor card 20 (FIG. 2) is designed to include the elements that are most likely to be upgraded, i.e. processor device 21 and a clock generator 23. As such, it is particularly useful when employed for upgrading a computer system. For example, prior art computer system upgrades in which only the processor chip is replaced on a motherboard are limited by requiring that the new processor adapt to the old motherboard clock rate. However, the present invention avoids the prior art motherboard clock rate limitation by simultaneously upgrading the clock and the processor. In this way, the upgraded processor device clock rate is not dependent on the previously defined motherboard clock rate.

Another advantage of the present invention over prior art practices is that redesigning a processor card of the present invention with an upgraded processor device requires less design time than redesigning a complete motherboard. The reason for this is that the processor card holds only two major types of devices, i.e. the processor and the clock device. Designing or modifying a board with multiple components is more complex with a larger number of components. In general, changing any one component will affect the performance or operation of one or more other components. Making adjustments to an affected component can in turn affect the performance or operation of the first component, or others.

For the processor card of the present invention, aside from the parts on the card working together, the card need only meet the interface specification required to communicate with the motherboard. As a result, the need for overall changes to the card are kept to a minimum. In contrast, a typical motherboard holds and interconnects many more devices than a processor card of the present invention. Consequently, it takes more time to design and trouble-shoot a new motherboard than to redesign a processor card of the present invention. Thus, the present invention's processor card also has the advantage of requiring minimal redesign time.

Figure 2:
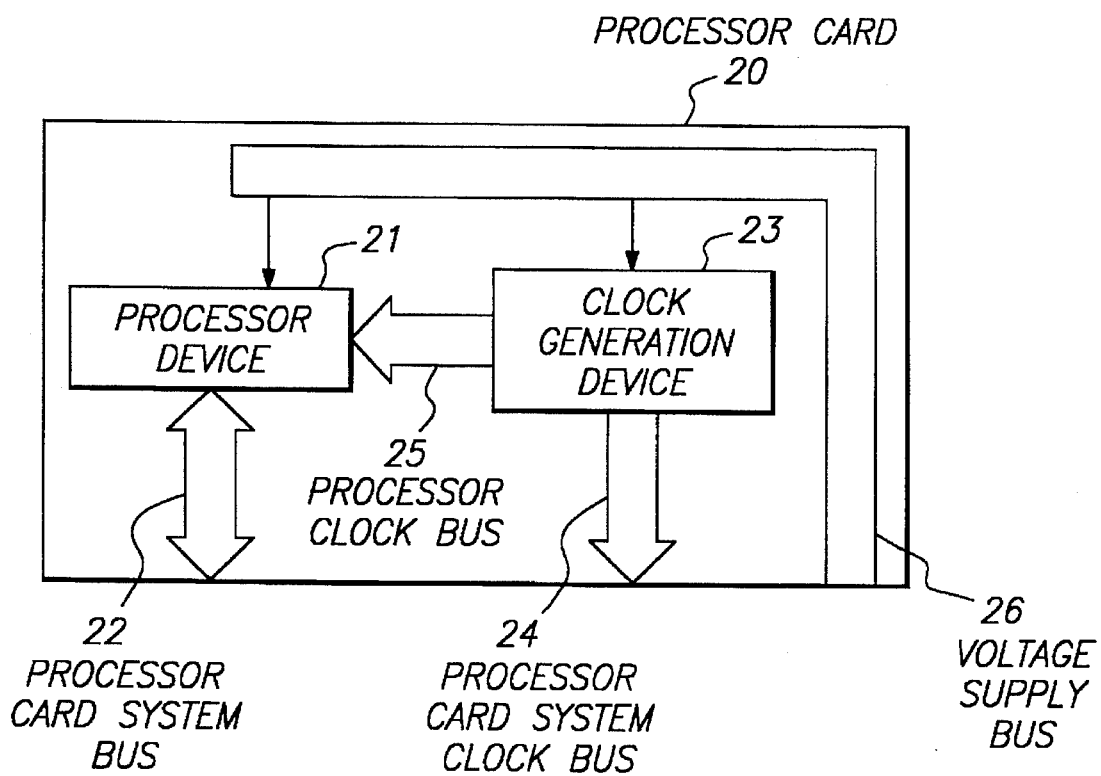
FIG. 2 illustrates a first embodiment of the processor card of the present invention.

FIG. 2 illustrates a first embodiment of the processor card 20 of the present invention including processor device 21, its associated processor card system bus 22, clock generation device 23, its associated processor card system clock bus 24, processor clock bus 25, and voltage supply bus 26.

Processor device 21 may be implemented with a computer system CPU or may be any other type of processor device.

Clock generation device 23 provides clock signals that have the same or different rates, but particularly provides at least one clock signal compatible with processor device 21.

System bus 22 carries signals to and from processor device 21 and clock generation device 23 provides at least one clock signal on each of system clock bus 24 and processor clock bus 25. Voltage supply bus 26 couples appropriate supply voltages to each of devices 21 and 23.

Clock generator 23 may couple the same or different clock signals onto each of buses 24 and 25. In addition, buses 24 and 25 are not limited to a single clock signal. Consequently, clock buses 24 and 25 may constitute multiple signal lines as will be described in conjunction with FIG. 4.

In one embodiment, processor card 20 may simply be designed such that buses 22, 24 and 26 are conductively connected to any electrical apparatus having a PCB connector. In the preferred embodiment, processor card 20 is designed such that buses 22, 24, and 26 are conductively connected to another printed circuit board in order to complete a processor-based system. This may be achieved in a variety of manners which are well known in the art of PCB design. For instance, the PCB traces corresponding to buses 22, 24, and 26 may extend to the edge of card 20 to form an edge connector. The edge connector can then be inserted into a PCB socket located on another PCB.

The voltage supply bus 26 shown in FIG. 2 may include multiple supply lines. The supply lines are conductively connected to an external voltage supply source provided either directly from an external power supply or through circuitry that the processor card is coupled to. It should be understood that each supply line corresponds to a PCB trace on processor card 20 and the size of each PCB trace is dependent on the amount of current carried by each.

Figure 3:
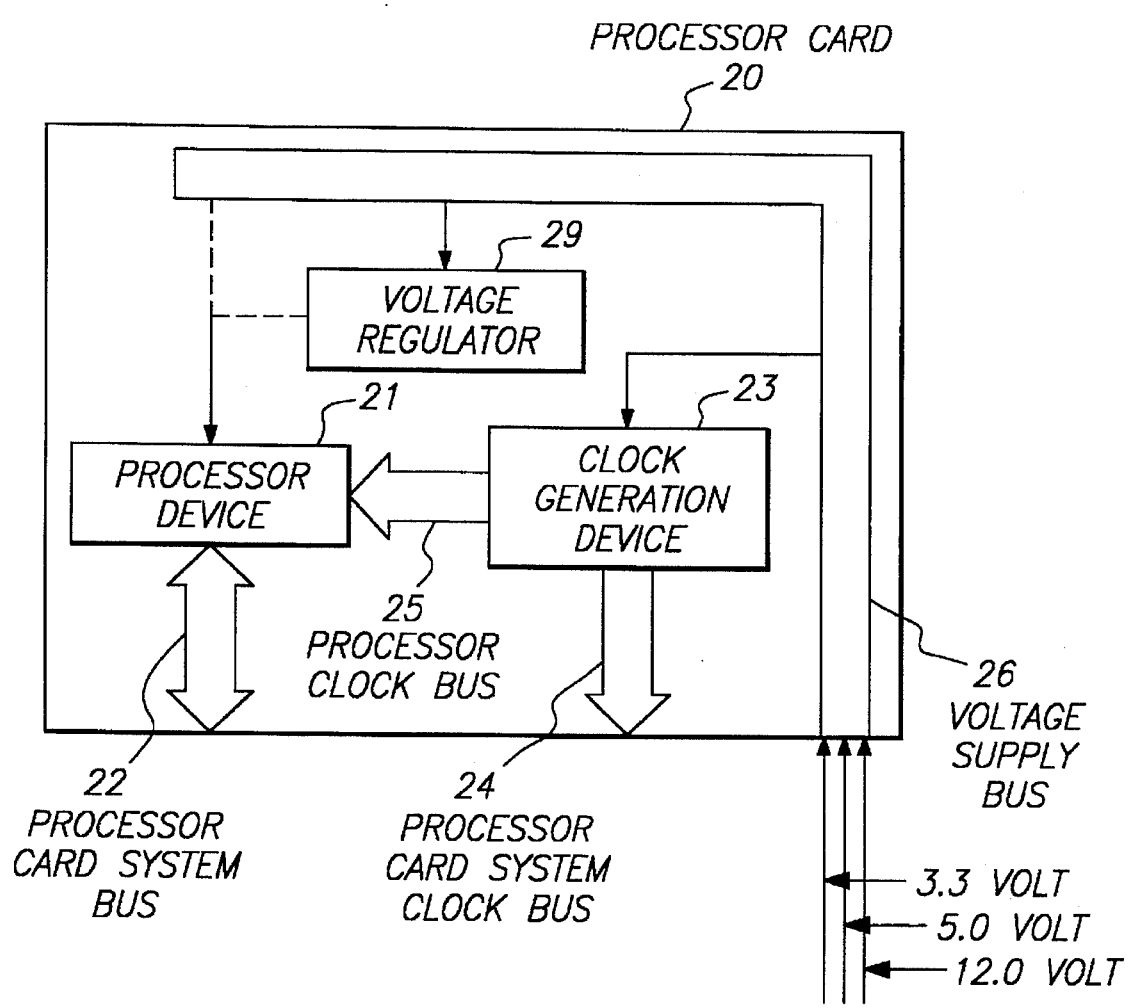
FIG. 3 illustrates a second embodiment of the processor card of the present invention including various voltage supply options.

FIG. 3 shows the manner in which several voltage options are provided to processor card 20 of the present invention. Three voltage supply lines are coupled to voltage supply bus 26 of processor card 20 shown in FIG. 3: 3.3 volts, 5.0 volts, and 12.0 volts. These voltages are used as supplies by devices 21 and 23. In addition these voltages may provide a bias voltage to voltage regulator 29. Each processor and clock device may or may not use each voltage provided on voltage supply bus 26.

In one embodiment, voltage regulator 29 is provided to supply a range of voltages. Processor 21 may receive a supply voltage from regulator 29 and/or voltage bus 26. In one embodiment, voltage regulator 29 generates a voltage that is equal to one of the voltages provided by bus 26. However, the voltage provided by the regulator may have a tighter tolerance than that provided by the supply bus resulting in increased processor speed and system performance.

Figure 4:
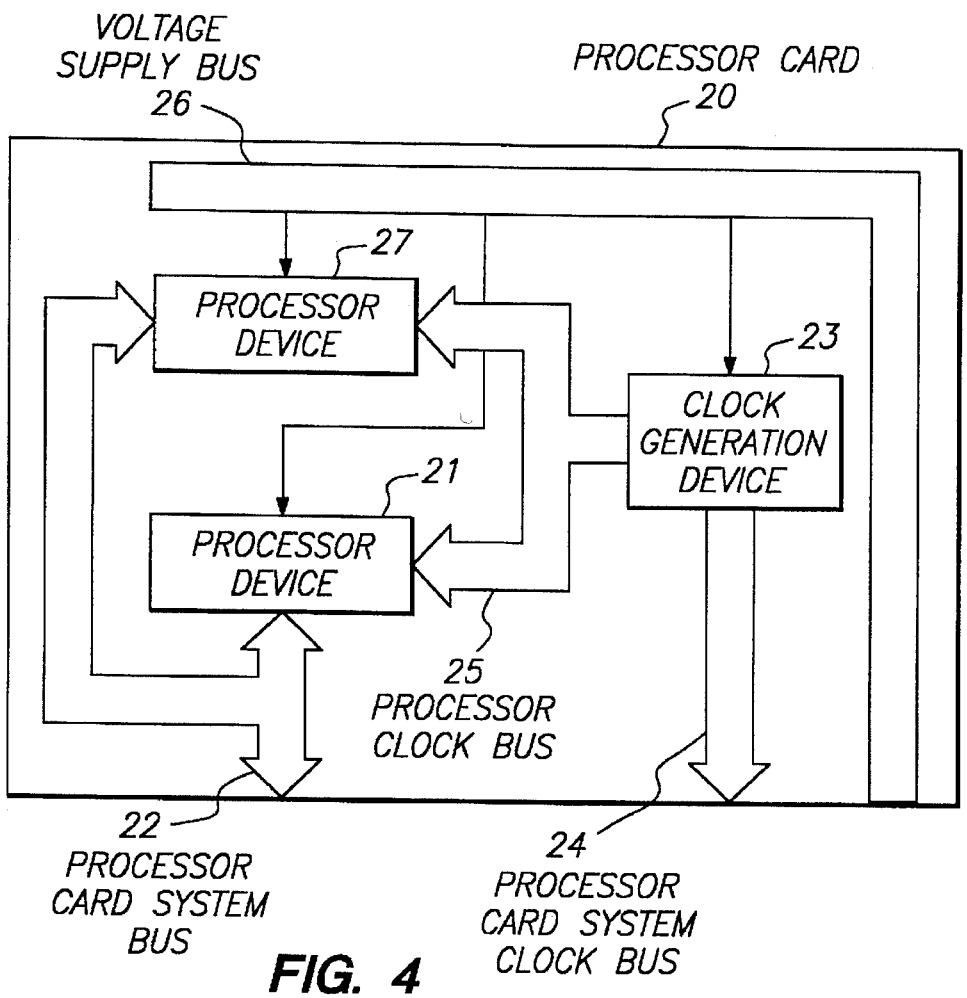
FIG. 4 illustrates a third embodiment of the processor card of the present invention having more than one processor device.

FIG. 4 illustrates an alternative embodiment of the present invention including two processor devices 21 and 27 on processor card 20. In the case in which each of processor devices 21 and 27 require a clock signal having the same rate the clock signals provided to processor device 27 are taken from processor clock bus 25. Separate clock signal buses may be employed if processors 21 and 27 have different clock rates.

Processor 27 shares processor card system bus 22 with processor 21. System arbitration provided external to processor card 20 determines which of processors 21 or 27 has control of system bus 22. In a modular system including more than one processor card, this dual processor card may be employed to replace a single processor card thus, converting a single processor system into a dual processor system. Multiple processor (MP) systems, particularly computer systems utilizing multiple processors, are well known in the art as providing increased processing capabilities in certain applications.

Clock Generation on Processor Card

In the above described embodiments in which a single clock signal is coupled onto system clock bus 24 and is transmitted to an external system (i.e. another PCB), the clock signal is typically routed to other devices in the external system. As a result, due to the placement of the external devices, the clock may have to travel different distances to each external device which can result in a skew between each of the device's received clock signal. In other words, a time difference or skew may occur between the time that a particular leading (or trailing) edge of the clock signal reaches a first device relative to the time when the same leading (or trailing) edge reaches a second device. In order to reduce the clock skew between external system device clock signals the present invention provides multiple clock signals on system clock bus 24. These multiple clocks may then be coupled to one or more external system devices in a manner that reduces clock signal skew issues between each of the devices.

Figure 5:
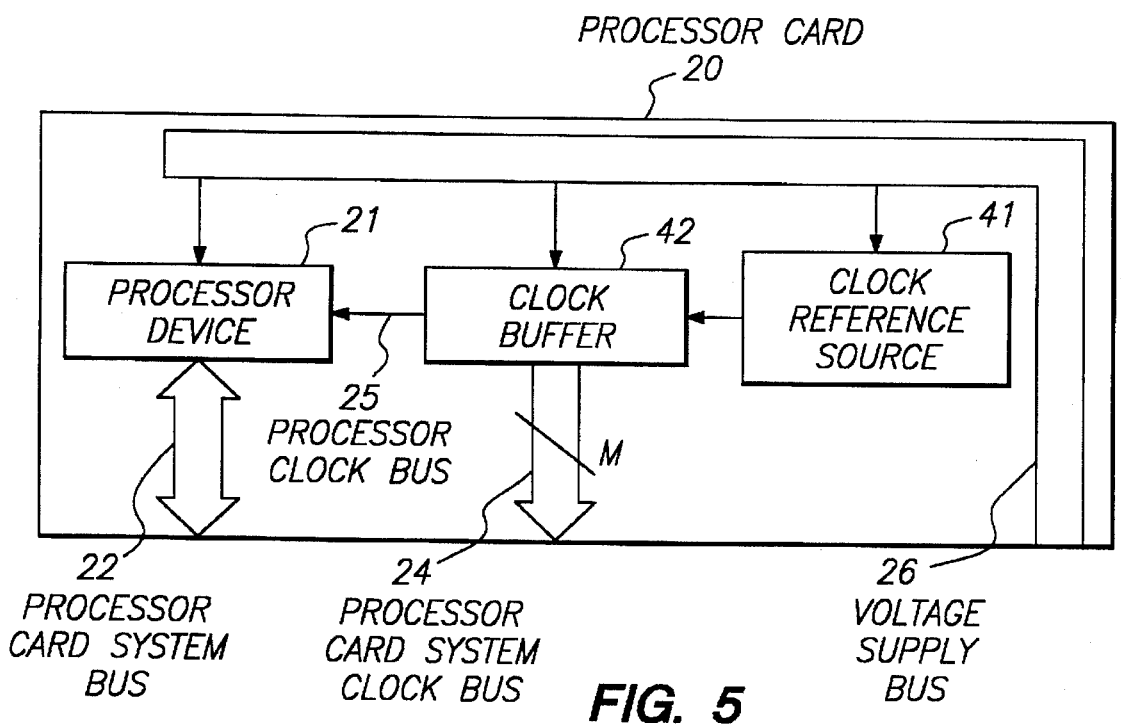
FIG. 5 illustrates a fourth embodiment of the processor card of the present invention having a first type of clock configuration.

FIG. 5 illustrates another embodiment of the processor card of the present invention in which one clock signal is coupled to processor 21 (on processor clock bus 25) and m clock signals are coupled onto system clock bus 24. In this implementation, clock reference source 41 and clock buffer 42 generate the processor card clock signals. Clock reference source 41 generates a reference signal. In the embodiment shown in FIG. 5, clock signal reference source 41 is implemented using a crystal. In another embodiment, device 41 is implemented using an oscillator.

Clock signal source 41 couples the reference clock signal to buffer 42. Clock buffer 42 couples one copy of the reference clock to processor clock bus 25 and m copies of the reference clock to system clock bus 24. In this embodiment, the clock signal coupled on processor clock bus 25 is internally multiplied by processor 21 to accommodate required internal processor clock rate/s. In the preferred embodiment of the present invention, six clock signals are generated by buffer 42 for coupling to bus 24.

It should be noted that the clock signals generated by buffer 42 are essentially equivalent clock signals meaning that each of the multiple clock signals have jitter characteristics, a duty cycle, and a frequency within a given acceptable window according to the computer system design.

In one particular embodiment of the present invention, reference clock source 41 generates a 40 MHz clock signal. This clock signal is passed to system clock bus 24 and processor clock bus 25. Processor 21 internally multiplies the reference clock signal to a 120 MHz clock signal, (i.e. multiplies by 3). In another embodiment, a reference clock rate of 44 MHz is generated such that the processor clock rate is equal to 132 MHz and the system clock rate is 44 MHz. It should be noted that processor device 21 is not limited to increasing the reference clock rate by a factor of three. For instance in another embodiment, processor device 21 increases the reference clock rate by a factor of two such that the reference and system clock rates are equal to 50 MHz and the processor clock rate is equal to 100 MHz. In still another embodiment, the reference and system clock rate are equal to 40 MHz and the processor clock rate is equal to 80 MHz. In still another embodiment, processor 21 internally generates multiple internal clock rates.

Figure 6:
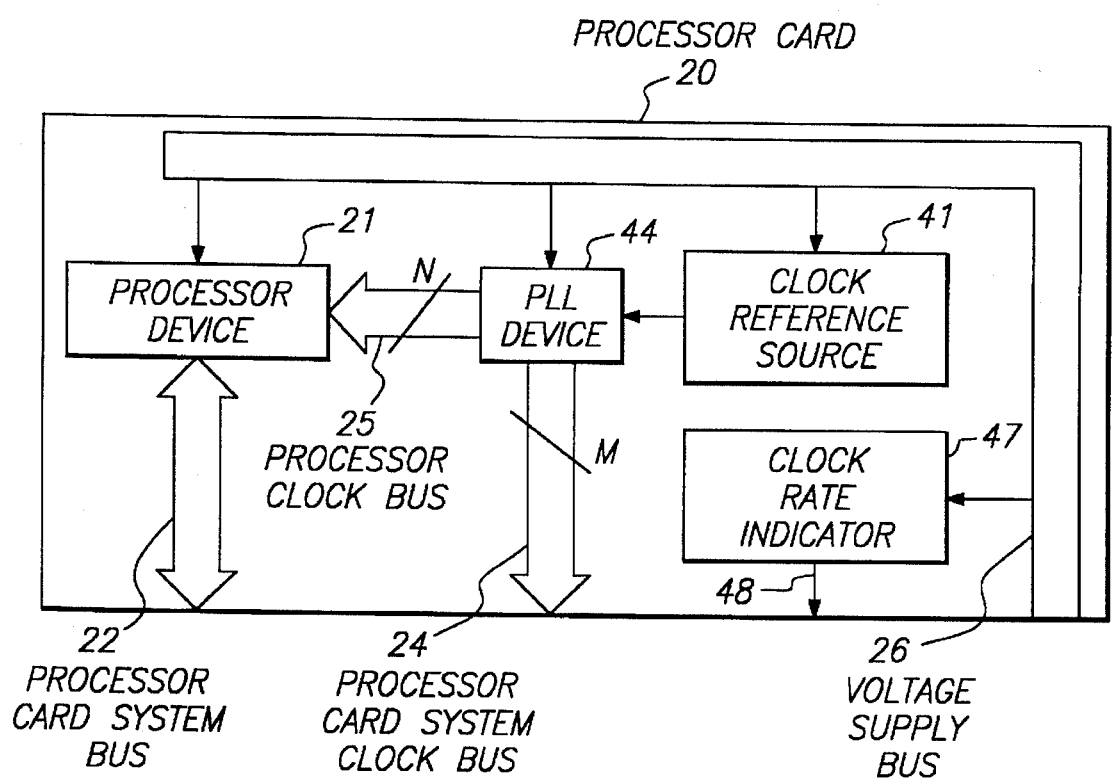
FIG. 6 illustrates a fifth embodiment of the processor card of the present invention having a second type of clock configuration.

FIG. 6 illustrates an embodiment of the processor card of the present invention in which multiple clock signals are coupled to both system bus 22 and system clock bus 24 that may or may not have the same rate as the reference clock rate. Clock generation is performed by clock source device 41 and phase locked loop (PLL) device 44. PLL 44 functions to multiply the reference clock signal to clock rates compatible with processor 21 and to system clock bus 24. FIG. 6 shows PLL device 44 providing n clock signals on bus 25 to processor 21 and m clock signals on system clock bus 24.

In one embodiment of the present invention, n=3 and m=6 and PLL device 44 couples first, second and third processor clock signals onto processor clock bus 25 where: the first clock signal rate is equal to two times the processor clock rate, the second clock signal rate is equal to the processor clock rate, and the third clock signal rate is equal to half the processor clock rate. In this implementation, the reference source clock signal is equal to 25 MHz and the processor clock rate is 100 MHz. PLL device 44 generates and couples three clock signals, 200 MHz, 100 MHz and 50 MHz to processor device 21. The PLL also couples m 50 MHz clock signals onto bus 24.

The processor card shown in FIG. 6 also includes clock rate indicator 47. The clock rate indicator generates a signal on bus 48 indicating the rate of the reference clock signal generated by device 41. In one embodiment, bus 48 comprises three PCB traces that may be connectably coupled to the external system which processor card 20 is currently interfacing with. This information is often useful to system or application software programs when processor card 20 is implemented in a computer system. Any of the clock leads on the host board can be connected to one or more devices, using techniques known in the art. If more clock signals are needed a PLL device can be placed on the host board connected to one of the host lines and used to generate additional instances of the system clock, or even modify frequencies.

It should be noted that in some cases, clock skew may still occur between devices due to the distance that a given clock is transmitted from the processor card to a system device on the host card. In this case, clock skews between devices may be reduced by placing a delay line in the clock lines on the host board. Additional delay lines may also be used in clock lines coupled to system devices having particular clocking requirements. Thus, in one embodiment of the present invention, a delay line is used in the clock signal line coupled to the memory device to account for its particular clocking characteristics with respect to other system devices.

System Including a Processor Card and a Host Card

Figure 7:
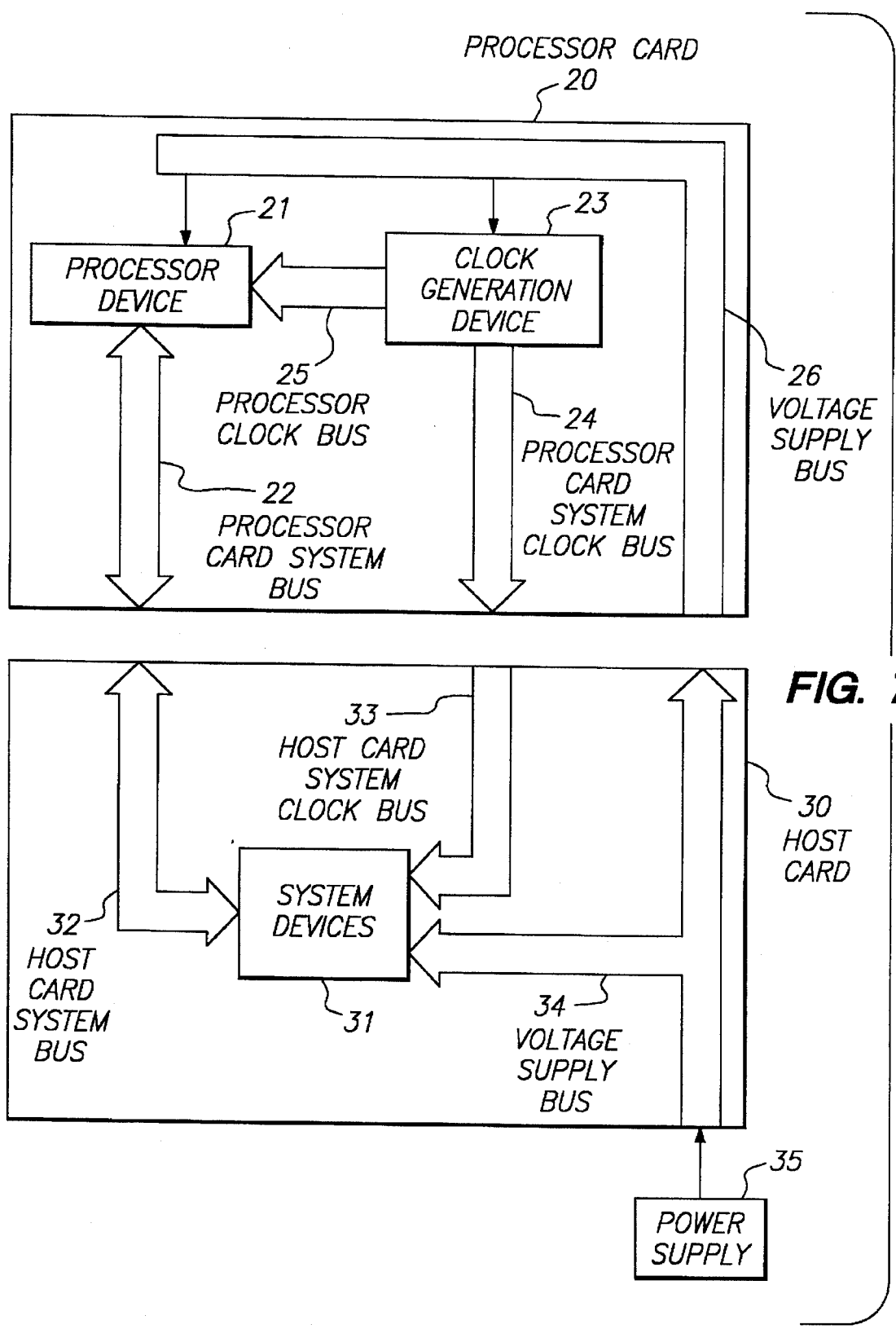
FIG. 7 illustrates a first embodiment of the system of the present invention having a processor card of the present invention and a host card.

FIG. 7 illustrates one embodiment of the system of the present invention including processor card 20 and host card 30. It should be understood that any embodiment previously described may be substituted for processor card 20 shown in FIG. 7.

Host card 30 includes system devices 31, host card system bus 32, and host card system clock bus 33. System devices 31 may include a variety of devices each providing a different functionality. Host card 30 is intended to be designed to include all of the elements necessary to complete the system other than processor device 21 and clock generation device 23.

Host card system bus 32 carries signals to and from each of system devices 31 and host card clock bus 33 carries clock signal/s to each of the system devices. The host card system and clock buses correspond to signal line traces that can be conductively connected to processor card 20. Hence, in one embodiment of the system of the present invention, the signal line traces corresponding to buses 32 and 33 are coupled to a PCB socket and processor card 20 is inserted into the socket to form a conductive connection.

A system of the present invention is formed by conductively connecting processor card system bus 22 to host card system bus 32 and processor card system clock bus 24 to the host card system clock bus 33. In the embodiment shown in FIG. 7, an external power supply 35 is shown being coupled to bus 34. In this case, voltages from host card 30 (bus 34) are coupled to processor card 20 (bus 26). In another embodiment, the external power supply may be independently connected to both the processor card and host card. In this case no supply voltage connection between processor card 20 and host card 30 is needed.

Figure 8:
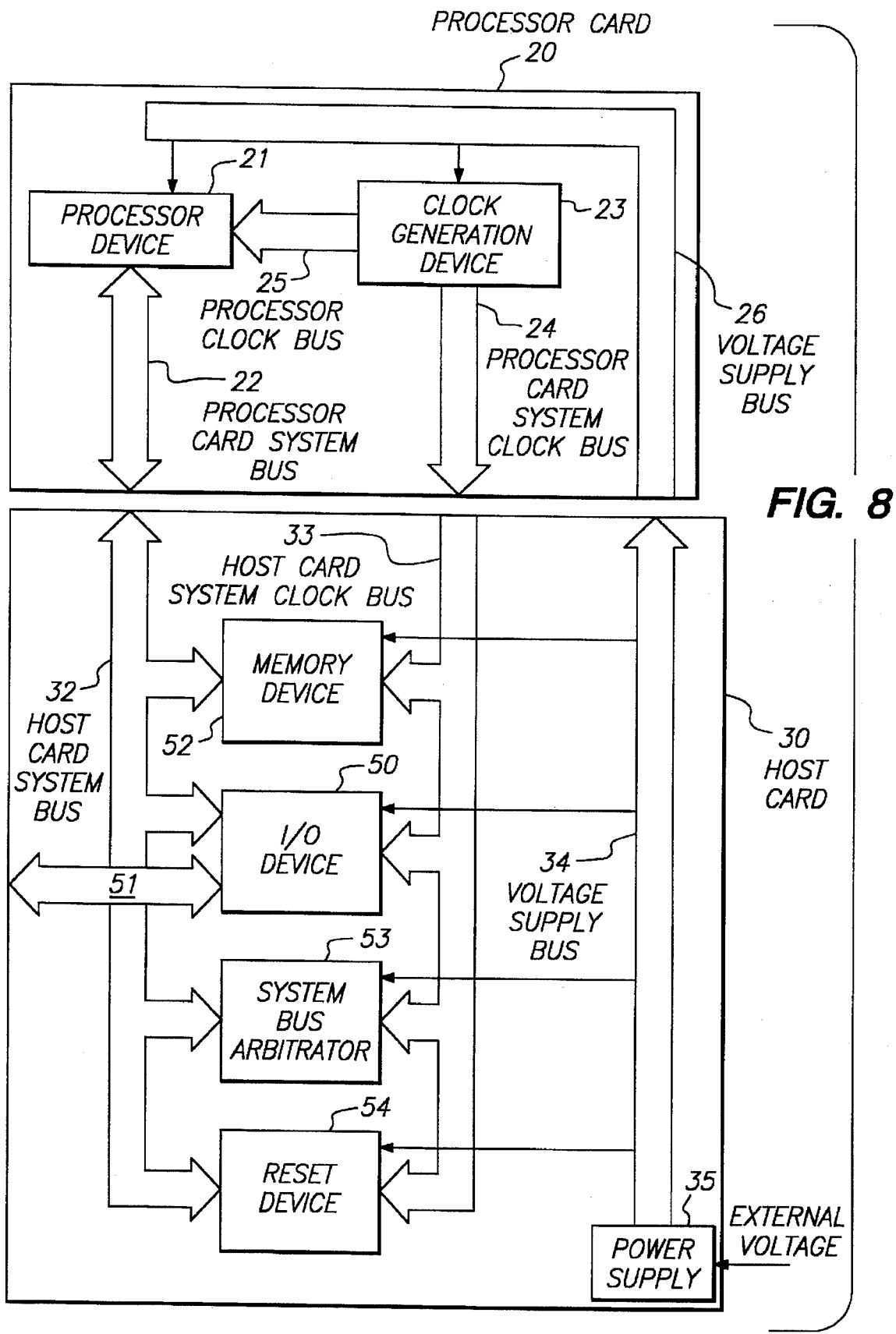
FIG. 8 illustrates a first embodiment of a computer system of the present invention having a processor card of the present invention and a host card including specific computer system devices.

FIG. 8 illustrates a computer system of the present invention including processor card 20 and host card 30. In this particular embodiment, host card 30 includes the minimum elements required to create a functional computer system other than the processor device and the clock generation device. Host card 30 includes I/O device 50 to provide a means of inputting and outputting data into the computer system on I/O bus 51, memory device 52 for storing and providing data when accessed, system bus arbitrator 53 for arbitrating signals on the system bus, reset device 54 for resetting all logic states within the computer system upon start-up, and main voltage supply 35. Signals coupled on the processor card and host card system buses include data and processor signals and system arbitration signals.

Other elements that may be included on host card 30 includes an I/O sub-system which includes all of the devices that communicate outside of the computer system, such as serial ports, SCSI ports, and PCI ports; memory devices, such as the processor memory and cache, system ROM, and video RAM; and a video sub-system which provides support for video data into the computer system and video graphics out of the computer system.

Modular Computer System

A modular computer system of the present invention includes more than one processor card 20 and more than one host card 30. Each of the processor cards within the modular computer system of the present invention may include a different processor and clock generator device than other processor cards in the modular system. For instance, one processor card may include a processor device having a first set of associated characteristics, (such as processor set-up and hold times, and processor frequency) and a clock generator that provides a system clock signal/s having a first clock rate. Another processor card may be designed to include a processor and clock generator device having a second set of processor characteristics and system clock rate. Still another processor card may include two processor devices. Host cards may differ in that they include different devices. For instance, a first host card may include devices for supporting video input/output data, whereas a second host card may not.

The processor cards and host cards within the modular computer system of the present invention are designed around (1) a set of characteristics and requirements for the processor and certain processor support chips, (2) a separate set of characteristics and requirements for other system devices (including at a minimum memory, memory management, and some sort of I/O but also including optional functionality such as video input, processing and output or a bus bridge to a standard bus such as PCI), and (3) a common system bus that can carry any signals (i.e. data, addresses and system arbitration signals) necessary for the processor device(s) to work with the other system devices. Thus, although each processor card or host may have different elements, all cards are designed to fulfill the above requirements.

For instance, each processor card 20 in a given modular system must provide a clock rate on its associated processor card system clock bus 24 that is within a given predetermined range while host cards 30 in the same modular system are designed to be adaptable to a clock rate within that predetermined range. For example, in one preferred embodiment a first host card is designed to function with a system clock rate within the range of 50–33 MHz. This host card can be coupled with a first processor card having a processor clock rate of 100 MHz and a system clock bus of 50 MHz. However, this same host card is adaptable to a second processor card having a 120 MHz processor clock rate and a 40 MHz system clock rate.

In the modular system of the present invention a single host card may interface with more than one processor card, each processor card potentially having a different associated processor device/s. Consequently, a processor device used on one processor card may or may not have the same associated set-up and hold times as a processor on another card. The host card, however, is tuned to specific set-up and hold times associated with a given processor device. Thus, it is necessary to make the input and output signals of every processor device employed with each processor card in a given modular system to appear to have the same set-up and hold times on system bus 21 as expected by all host cards within the modular system. This is accomplished by placing a delay line on processor clock bus 25 which effectively delays and adjusts the set-up and hold times of a processor on a processor card that does not have the expected output characteristics for the given modular computer system.

Processor PCB Design

Several design aspects of the present invention facilitate design of alternate or additional processor PCB cards. These include selecting a small number of components for the processor card, standardizing the position of components and the routing of traces on the processor PCB card, providing card inputs for a variety of voltages that may be needed for a range of alternative components, and selecting packaging for maximum similarity between alternative components.

For instance, as described above in one embodiment of the present invention, the processor card is designed with input ports so that it can be selectively coupled to one of several voltages. This allows for utilizing processor and clock generator devices on the processor board that employ one or more device technologies. It also allows for using the same basic processor PCB card design for other processor card designs utilizing different devices. For instance, a first processor card may use both a 5.0 volt supply processor and clock device while a second processor card may use a 3.3 volt processor and a 5.0 volt clock. However, the same basic processor PCB card design can be used for both. Devices are connected to either or both of the 3.3 volt or 5.0 volt supplies by performing small layout changes to the PCB design.

The voltage regulator as described above is employed to generate a range of voltages to be used by the processor and/or clock device. In the preferred embodiment, voltages ranging from 2.5–3.3 volts are generated by the voltage regulator. Thus, in this embodiment, the processor and clock generation devices can operate within a range of voltages determined by the voltage regulator.

Still another way in which the PCB may be quickly customized relates to the processor or clock device package-type. Specifically, the devices may be packaged in more than one type of package such as a quad flat pack (i.e. QFP) or a ball grid array (BGA) package. A QFP is a flat plastic or ceramic package with pins around all four sides whereas a BGA uses an array of balls on the bottom of the package to connect to the PC board. Each of these packages have unique manners in which they are mounted onto the PCB. For instance, the quadpack is inserted and soldered into holes in the PCB. However, the BGA package is not inserted into the PCB. Instead it is solder mounted onto the top of the PCB. The PCB is easily customized to adapt to any package by redesigning the plug-in area of the device while leaving the remaining areas on the PCB unchanged. Thus, the PCB is easily redesigned to accommodate more than one device package type.

Although the elements of the present invention have been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. A printed circuit board (PCB) processor card including:

a processor device, said processor device having an associated clock rate;

a system clock generator device, said system clock generator device coupling a processor clock signal to said processor device;

a processor card system bus for transmitting signals to and from said processor, said processor card system bus being connectable to a processor-based system which includes all system devices other than another processor device and another system clock generator device;

a processor card system clock bus, said system clock generator device coupling a system clock signal on said processor card system clock bus, said processor card system clock bus being connectable to said processor-based system.

2. The processor card as described in claim 1 further including a second processor device, said second processor device utilizing said processor card system bus for transmitting signals to and from said second processor device.

3. The processor card as described in claim 1 further including a video subsystem for providing support to input and output video data.

4. The processor card as described in claim 1 wherein said clock generator device includes a means for generating a reference system clock signal and a means for generating copies of said reference clock signal.

5. The processor card as described in claim 4 further including a clock rate indicator for indicating an associated clock rate of said reference clock signal.

6. The processor card as described in claim 4 wherein said system clock generator device includes a means for multiplying up and dividing down the clock rate of said reference clock signal.

7. The processor card as described in claim 1 further including a voltage supply bus for being connectably coupled to an external voltage supply, said voltage supply bus coupling a corresponding supply voltage to each of said processor device and said system clock generator device.

8. The processor card as described in claim 7 further including a voltage regulator responsive to a bias voltage for providing a range of voltage supplies to said processor device and said system clock generator device.

* * * * *